US 9,938,187 B2

(12) United States Patent
Hosseini

(10) Patent No.: US 9,938,187 B2
(45) Date of Patent: Apr. 10, 2018

(54) METHOD AND APPARATUS FOR MATERIAL PROCESSING USING MULTIPLE FILAMENTATION OF BURST ULTRAFAST LASER PULSES

(71) Applicant: ROFIN-SINAR TECHNOLOGIES INC., Plymouth, MI (US)

(72) Inventor: S. Abbas Hosseini, Orlando, FL (US)

(73) Assignee: ROFIN-SINAR TECHNOLOGIES LLC, Plymouth, MI (US)

(*) Notice: Subject to any disclaimer, the term of this patent is extended or adjusted under 35 U.S.C. 154(b) by 127 days.

(21) Appl. No.: 14/629,327

(22) Filed: Feb. 23, 2015

(65) Prior Publication Data

US 2015/0246415 A1 Sep. 3, 2015

Related U.S. Application Data

(60) Provisional application No. 61/946,420, filed on Feb. 28, 2014.

(51) Int. Cl.
*B23K 26/53* (2014.01)
*C03C 23/00* (2006.01)
*B23K 26/00* (2014.01)
*B23K 103/00* (2006.01)

(52) U.S. Cl.
CPC ...... *C03C 23/0025* (2013.01); *B23K 26/0006* (2013.01); *B23K 26/0057* (2013.01);
(Continued)

(58) Field of Classification Search
CPC .............. B23K 26/0624; B23K 26/064; B23K 26/0648; B23K 26/4025; B23K 26/0069;
(Continued)

(56) References Cited

U.S. PATENT DOCUMENTS 5,107,510 A 4/1992 Seguin et al.
6,084,897 A 7/2000 Wakabayashi et al.
(Continued)

FOREIGN PATENT DOCUMENTS

CA 2332154 9/2009
CA 2907757 9/2014
(Continued)

OTHER PUBLICATIONS

Migliore et al., Advances in Laser Singulation of Silicon, Paper #770, pp. 1-6, Coherent, Inc., Santa Clara, CA, USA; HBL Corporation, Daejeon 305-811 Korea.
Watanabe et al., Filamentation in Ultrafast Laser Material Processing, Book for Springer Series "Progress in Ultrafast Intense Laser Science", pp. 1-6.
Yoshino et al., Micromachining With a High Repetition Rate Femtosecond Fiber Laser, JLMN—Journal of Laser Micro/Nanoengineering, 2008, pp. 157-162, vol. 3, No. 3.
(Continued)

*Primary Examiner* — Brian Jennison
(74) *Attorney, Agent, or Firm* — Woodling, Krost and Rust

(57) ABSTRACT

A method of drilling multiple orifices in and texturing a substrate is disclosed and includes the following steps. Ultrafast laser pulses are passed through a beam splitting diffractive optical element and then multiple beams are passed through a distributive-focus lens focusing assembly. The relative distance and/or angle of said distributive-focus lens focusing assembly in relation to the laser source is adjusted focusing the pulses in a distributed focus configuration creating a principal focal waist and at least one secondary focal waist. The fluence level of the at least one secondary focal waists is adjusted such that it is or they are of sufficient intensity and number to ensure propagation of multiple filaments in the substrate. Photoacoustic compressive machining is performed and forms multiple volume(s) within the substrate.

16 Claims, 9 Drawing Sheets

Filaments inside the Substrate

(52) U.S. Cl.
CPC ............ B23K 26/53 (2015.10); C03C 23/001 (2013.01); B23K 2203/50 (2015.10); B23K 2203/52 (2015.10); B23K 2203/54 (2015.10); Y10T 428/24355 (2015.01)

(58) Field of Classification Search
CPC ............ B23K 2203/52; B23K 2203/54; B23K 2203/50; B23K 26/18; B23K 26/381; B23K 2201/40; B23K 26/067
USPC .................................................. 219/121.85
See application file for complete search history.

(56) References Cited

U.S. PATENT DOCUMENTS

| | | | |
|---|---|---|---|
| 6,407,360 | B1 | 6/2002 | Choo et al. |
| 6,552,301 | B2 | 4/2003 | Herman et al. |
| 7,033,519 | B2 | 4/2006 | Taylor et al. |
| 7,211,184 | B2 | 5/2007 | Webster et al. |
| 7,303,977 | B2 | 12/2007 | Voronov et al. |
| 7,605,344 | B2 | 10/2009 | Fukumitsu |
| 7,626,138 | B2 | 12/2009 | Bovatsek et al. |
| 8,097,830 | B2 | 1/2012 | Woeste et al. |
| 8,624,157 | B2 | 1/2014 | Albelo et al. |
| 8,835,802 | B2 | 9/2014 | Baer |
| 8,842,358 | B2 | 9/2014 | Bareman et al. |
| 8,852,698 | B2 | 10/2014 | Fukumitsu |
| 2002/0125232 | A1 | 9/2002 | Choo et al. |
| 2003/0006221 | A1 | 1/2003 | Hong et al. |
| 2005/0272223 | A1 | 12/2005 | Fujii et al. |
| 2006/0207976 | A1 | 9/2006 | Bovatsek et al. |
| 2009/0151996 | A1 | 6/2009 | Mishima et al. |
| 2009/0294422 | A1 | 12/2009 | Lubatschowski et al. |
| 2010/0084384 | A1 | 4/2010 | Bovatsek et al. |
| 2011/0259631 | A1* | 10/2011 | Rumsby ............. B23K 26/0613 174/264 |
| 2012/0234807 | A1 | 9/2012 | Sercel et al. |
| 2013/0126573 | A1 | 5/2013 | Hosseini et al. |
| 2014/0079570 | A1 | 3/2014 | Schweitzer et al. |
| 2014/0199519 | A1 | 7/2014 | Schillinger et al. |
| 2014/0213040 | A1 | 7/2014 | Morikazu et al. |
| 2014/0248757 | A1 | 9/2014 | Morikazu et al. |
| 2014/0340730 | A1 | 11/2014 | Bergh et al. |
| 2015/0166393 | A1 | 6/2015 | Marjanovic et al. |
| 2015/0166394 | A1 | 6/2015 | Marjanovic et al. |
| 2015/0360991 | A1 | 12/2015 | Grundmueller et al. |
| 2015/0367442 | A1 | 12/2015 | Bovatsek et al. |
| 2016/0009586 | A1 | 1/2016 | Bookbinder et al. |
| 2016/0031745 | A1 | 2/2016 | Ortner et al. |
| 2016/0059359 | A1 | 3/2016 | Krueger et al. |
| 2016/0060156 | A1 | 3/2016 | Krueger et al. |

FOREIGN PATENT DOCUMENTS

| | | |
|---|---|---|
| CN | 102785031 | 4/2015 |
| EP | 2781296 | 9/2014 |
| EP | 2754524 | 11/2015 |
| JP | 2010160734 | 7/2010 |
| JP | 4692717 | 3/2011 |
| JP | 5089735 | 9/2012 |
| JP | 5271092 | 5/2013 |
| WO | 2009114375 A2 | 9/2009 |
| WO | 2012006736 | 1/2012 |
| WO | 2014075995 | 5/2014 |
| WO | 2014079570 | 5/2014 |
| WO | 2014111385 | 7/2014 |
| WO | 2014111794 | 7/2014 |
| WO | 2014121261 | 8/2014 |
| WO | 2014134470 | 9/2014 |
| WO | 2014144322 | 9/2014 |
| WO | 2014147048 | 9/2014 |
| WO | 2014161535 | 10/2014 |
| WO | 2015075059 | 5/2015 |
| WO | 2015094994 | 6/2015 |
| WO | 2015095264 | 6/2015 |
| WO | 2016007843 | 1/2016 |
| WO | 2016010949 | 1/2016 |
| WO | 2016079063 | 5/2016 |
| WO | 2016079275 | 5/2016 |

OTHER PUBLICATIONS

Rezaei, Saeid, Burst-Train Generation for Femtosecond Laser Filamentation-Driven Micromachining, Thesis, Graduatuate Department of Electrical and Computer Engineering, Jan. 2011, pp. 1-118, University of Toronto.

Nguyen et al., Optical Breakdown Versus Filamentation in Fused Silica by Use of Femtosecond Infrared Laser Pulses, Optics Letters, vol. 28, No. 17, Sep. 1, 2003, pp. 1591-1593, Department of Physics, Universite Laval, Quebec, Canada.

Nicholson, David, Laser Pulse Filamentation, Submitted Coursework for PH240, Stanford University, Nov. 27, 2011, pp. 1-4.

Zlotnicki, Steve, What Is Cutting Kerf, May 19, 2013, www.esab-cutting.com, pp. 1-4.

Jha et al., An Integrated PCR Microfluidic Chip Incorporating Aseptic Electrochemical Cell Lysis and Capillary Electrophoresis Amperometric DNA Detection for Rapid and Quantitative Genetic Analysis, The Royal Society of Chemistry, Lab on a Chip, 2012, 12, 4455-4464.

Applied Biosystems Chemistry Guide, DNA Sequencing by Capillary Electrophoresis, Second Edition, 2009, pp. 1-250.

PE Applied Biosystems, Automated DNA Sequencing, Chemistry Guide, 1998, pp. 1-245.

Muller et al, Short-Pulse Lasers Enable Transparent Materials Processing, Industrial Photonics, Oct. 2014, pp. 8-10.

Hosseini, S. Abbas, Method and Apparatus for Hybrid Photoacoustic Compression Machining in Transparent Materials Using Filamentation by Burst Ultrafast Laser Pulses, U.S. Appl. No. 14/520,824, filed Oct. 22, 2014, Applicant: Rofin-Sinar Technologies Inc.

Hosseini, S. Abbas, System for Performing Laser Filamentation Within Transparent Materials, U.S. Appl. No. 14/336,912, filed Jul. 21, 2014, Applicant: Rofin-Sinar Technologies Inc.

Hosseini, S. Abbas, Method and Apparatus for Performing Laser Filamentation Within Transparent Materials, U.S. Appl. No. 14/336,819, filed Jul. 21, 2014, Applicant: Rofin-Sinar Technologies Inc.

Hosseini, S. Abbas, Method of Fabricating a Glass Magnetic Hard Drive Disk Platter Using Filamentation by Burst Ultrafast Laser Pulses, U.S. Appl. No. 14/512,180, filed Oct. 10, 2014, Applicant: Rofin-Sinar Technologies Inc.

Hosseini, S. Abbas, Method and Apparatus for Machining Diamonds and Gemstones Using Filamentation by Burst Ultrafast Laser Pulses, U.S. Appl. No. 14/521,114, filed Oct. 22, 2014, Applicant: Rofin-Sinar Technologies Inc.

Hosseini, S. Abbas, Mass Based Filtration Devices and Method of Fabrication Using Bursts of Ultrafast Laser Pulses, U.S. Appl. No. 14/531,761, filed Nov. 3, 2014, Applicant: Rofin-Sinar Technologies Inc.

Hosseini, S. Abbas, Method of Closed Form Release for Brittle Materials Using Burst Ultrafast Laser Pulses, U.S. Appl. No. 14/538,648, filed Nov. 11, 2014, Applicant: Rofin-Sinar Technologies Inc.

Hosseini, S. Abbas, Method and Apparatus for Forward Deposition of Material Onto a Substrate Using Burst Ultrafast Laser Pulse Energy, U.S. Appl. No. 14/542,647, filed Nov. 16, 2014, Applicant: Rofin-Sinar Technologies Inc.

Hosseini, S. Abbas, Method and Apparatus for Spiral Cutting a Glass Tube Using Filamentation by Burst Ultrafast Laser Pulses, U.S. Appl. No. 14/547,729, filed Nov. 19, 2014, Applicant: Rofin-Sinar Technologies Inc.

Hosseini, S. Abbas, Electro/Mechanical Microchips and Method of Making With Burst Ultrafast Laser Pulses, U.S. Appl. No. 14/539,861, filed Nov. 12, 2014, Applicant: Rofin-Sinar Technologies Inc.

(56) References Cited

OTHER PUBLICATIONS

Chin et al., The Propagation of Powerful Femtosecond Laser Pulses in Optical Media: Physics, Applications, and New Challenges, Einstein Centennial Review Article, Can. J. Phys. vol. 83, 2005, pp. 863-905.

Hosseini et al., Measurement of Filament Length Generated by an Intense Femtosecond Laser Pulse Using Electromagnetic Radiation Detection, Applied Physics B, 2003, pp. 583-586, vol. 76, Quebec, Canada.

Hosseini et al., Multi-Parameter Characterization of the Longitudinal Plasma Profile of a Filament: A Comparative Study, Applied Physics B, 2004, pp. 519-523, vol. 79.

Hosseini et al., Competition of Multiple Filaments During the Propagation of Intense Femtosecond Laser Pulses, The American Physical Society, Physical Review A 70, 033802, 2004, pp. 1-12.

Hosseini, S. Abbas, Method and Apparatus for Non-Ablative, Photoacoustic Compression Machining in Transparent Materials Using Filamentation by Burst Ultrafast Laser Pulses, U.S. Appl. No. 13/958,346, filed Aug. 2, 2013, Applicant: Rofin-Sinar Technologies Inc.

Hosseini, S. Abbas, Method and Apparatus for Laser Processing of Silicon by Filamentation of Burst Ultrafast Laser Pulses, U.S. Appl. No. 14/566,078, filed Nov. 28, 2014, Applicant: Rofin-Sinar Technologies Inc.

Strigin et al., Laser Processing of Glass by Picosecond Pulses, Quantum Electronics, 1994, pp. 732-735, vol. 24, No. 8, Kvantovaya Elektronika and Turpion Ltd.

Bhuyan et al., High Aspect Ratio Taper-Free Microchannel Fabrication Using Femtosecond Bessel Beams, Optics Express, Jan. 18, 2010, pp. 566-574, vol. 18, No. 2.

\* cited by examiner

Filaments inside
the Substrate

Filaments inside
the Substrate

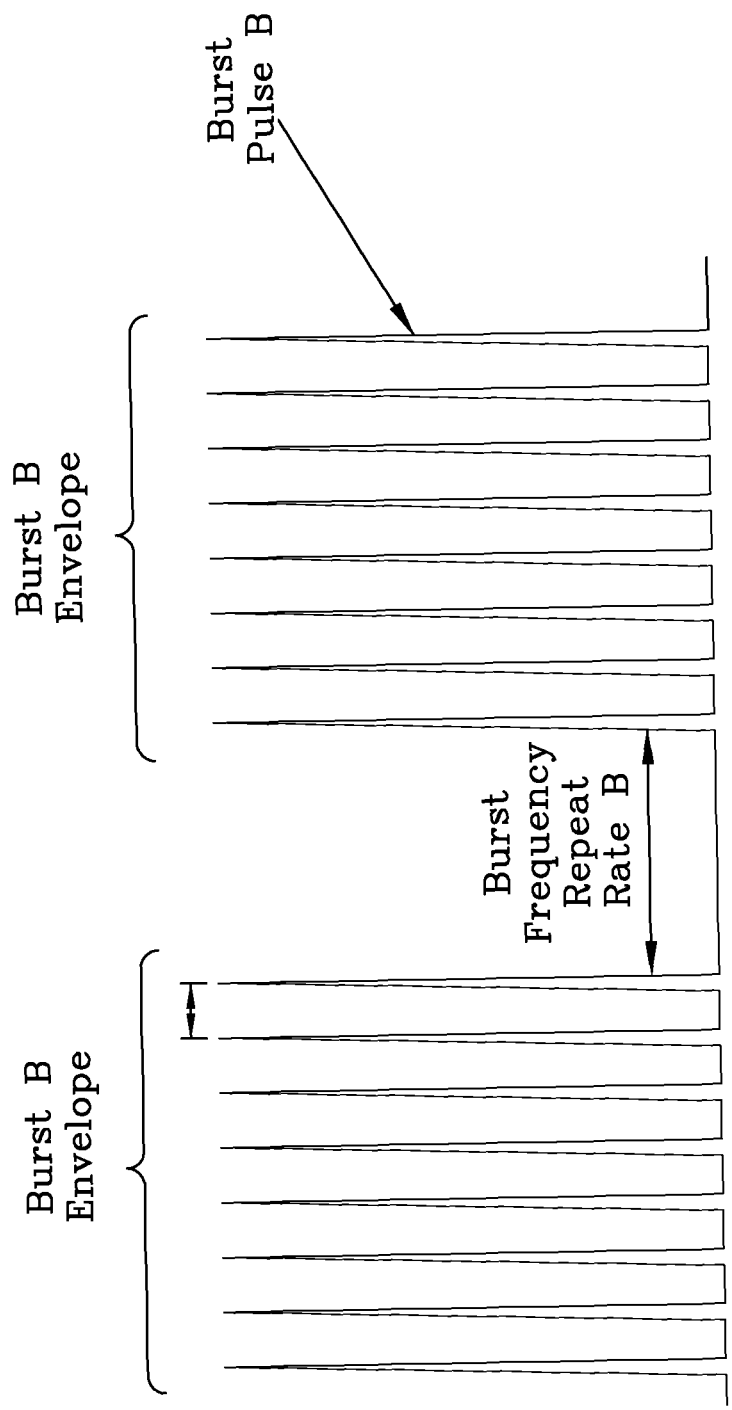

METHOD AND APPARATUS FOR MATERIAL PROCESSING USING MULTIPLE FILAMENTATION OF BURST ULTRAFAST LASER PULSES

This patent application claims priority to and the benefit of U.S. provisional patent application Ser. No. 61/946,420 filed Feb. 28, 2014. U.S. provisional patent application Ser. No. 61/946,420 filed Feb. 28, 2014 is incorporated herein in its entirety by reference hereto.

FIELD OF THE INVENTION

The present invention relates to a method and apparatus for material processing by multiple filamentation of ultrafast burst pulses in transparent materials, primarily, but not limited to, glass, sapphire, silicon, glass ceramics such that the structural characteristics of the material exceed that found in the prior art. The process can be used as an efficient surface structuring, multiple orifice hole drilling, surface and volume grating.

BACKGROUND OF THE INVENTION

One application of a surface textured substrate in the solar cell industry is to enhance light absorption. Research shows some wavelengths of incident light reflect from non-textured solar cell surfaces. Texturing causes light to be trapped and results in more efficient solar cells. To make LEDs more efficient, patterned sapphire substrates (PSS) have been developed. Patterned substrates produce brighter LEDs. Using a Sapphire substrate as a base, two layers of GaN (p and n doped) are coated that act as light emitting diode. In unpatterned Sapphire substrates, emitted light reflects back and forth and is trapped between GaN and Sapphire base increasing LED temperature resulting in lower efficiency and less emission of light. PSS helps skip of light and enhances light extraction about 30% more. It also helps for better epitaxial GaN growth.

Currently, the prior art laser material processing systems produce textures or orifices in substrates such as glass or Si by laser exposure techniques such as: ablative machining via direct writing; lithography techniques (coating surface with light sensitive materials and then printing desired pattern then etching). All of the prior art systems have low throughput times and are not cost effective, do not work well with many of the new exotic substrate materials, have problems with the opacity of multiple level substrate stacks, cannot attain the close orifice spacing sought, propagate cracks in the material or leave an unacceptable surface roughness on the orifice sides and surface surrounding the point of initiation as detailed below. In direct laser writing, thermal transport during the laser interaction can lead to large regions of collateral thermal damage (i.e. heat affected zone). While laser ablation processes can be dramatically improved by selecting lasers with wavelengths that are strongly absorbed by the medium (for example, deep UV excimer lasers or far-infrared $CO_2$ laser), the above disadvantages cannot be eliminated due to the aggressive interactions inherent in this physical ablation process. Alternatively, laser ablation can also be improved at the surface of transparent media by reducing the duration of the laser pulse. This is especially advantageous for lasers that are transparent inside the processing medium. When focused onto or inside transparent materials, the high laser intensity induces nonlinear absorption effects to provide a dynamic opacity that can be controlled to accurately deposit appropriate laser energy into a small volume of the material as defined by the focal volume. The short duration of the pulse offers several further advantages over longer duration laser pulses such as eliminating plasma reflections and reducing collateral damage through the small component of thermal diffusion and other heat transport effects during the much shorter time scale of such laser pulses. Femtosecond and picosecond laser ablation therefore offer significant benefits in machining of both opaque and transparent materials. However, machining of transparent materials with pulses even as short as tens to hundreds of femtosecond is also associated with the formation of rough surfaces and microcracks in the vicinity of laser-formed orifices or trench that is especially problematic for brittle materials like Alumnia glasses, doped dielectrics and optical crystals. Further, ablation debris will contaminate the nearby sample and surrounding surfaces. Although laser processing has been successful in overcoming many of the limitations associated with texturing, as mentioned above, new material compositions have rendered the wafers and panels incapable of being laser processed efficiently.

Henceforth, a fast, economical system for texturing and drilling through or stopped orifices in transparent materials emanating from the top or bottom surface, that avoids the drawbacks of existing prior art systems would fulfill a long felt need in the materials processing industry. This new invention utilizes and combines known and new technologies in a unique and novel configuration to overcome the aforementioned problems.

SUMMARY OF THE INVENTION

Propagation of ultrafast laser pulses (>5 MW peak power) in transparent optical media is complicated by the strong reshaping of the spatial and temporal profile of the laser pulse through a combined action of linear and nonlinear effects such as group-velocity dispersion (GVD), linear diffraction, self-phase modulation (SPM), self-focusing, multiphoton/tunnel ionization (MPI/TI) of electrons from the valence band to the conduction band, plasma defocusing, and self-steepening. These effects play out to varying degrees that depend on the laser parameters, material nonlinear properties, and the focusing condition into the material. Any spatial deformation on the pulse profile might result in localized self focusing creating hot zones in the beam. Each deformation can potentially develop to reach to critical peak intensity for plasma generation resulting in filament formation. This is the main root of multiple filament formation. Natural multiple filamentation is random by its nature but it can be controlled properly for some interesting laser processing applications.

One purpose of the present invention, which will be described subsequently in greater detail, is to provide an apparatus and method for producing multiple filaments irradiated on or into material to create surface or volume modification/deformation and structuring. Multiple techniques can be used to make a series of adjacent filaments such as diffracting optical elements (micro lens arrays, 2D beam splitters), multi-facet cylindrical lens, multi-facet Fresnel prism, pyramid prism. A few physical phenomena are involved in this process such as diffraction and interference of coherent light, burst laser micromachining, photoacoustic compression and burst laser filamentation.

Original Gaussian spatial profile pulse propagates through a variety of optical elements and is diffracted in multiple domains. Each domain potentially can go through self-phase modulation resulting in self-focusing of each domain inside the material if peak power exceeds the critical power value for the said material. Each domain forms a filament. Filament formation accompanied with shock wave generation which modifies the material by micro size melting and pushing the melted material outwardly from the center of the filament creating orifices. Photoacoustic effect is pronounced if high frequency burst laser pulses are used. As such, heat accumulation takes place locally during the process, and consecutive pulses always interact with the heated substrate initiated from previous pulses.

In laser treated surfaces, orifices created on the surface end at a specified depth. This provides a surface with structured configuration which is technically called a textured surface. In the prior art each hole or valley is initiated with a single laser pulse (direct writing). The instant invention makes many surface interactions with a single laser exposure. This technique can be used for surface texturing, marking, and/or printing. In solar cell production and in the LED industry texturing is important to enhance the light absorption or area expansion. In HDD (hard disk drive) manufacturing this type of quick texturing can be used for head park area. Due to diffraction of natural light from this surface, colorful marking can be accomplished that gives a rainbow color art effect when the viewing angle is changed.

A photoacoustic compression method of drilling orifices in and texturing a transparent substrate is disclosed and claimed. The method comprises the steps of: passing ultrafast laser pulses from a laser source through a diffractive optical element; passing the ultra fast laser pulses through a distributive-focus lens focusing assembly; adjusting the focus of the ultrafast laser pulses such that the laser fluence of the ultrafast laser pulses forms spots on the surface of the substrate and the spots are located above or below the principal focal waist; adjusting the fluence level of the at least one secondary focal waists such that it is or they are of sufficient intensity and number to ensure propagation of photoacoustic compressive machining through volumes of the substrate; and applying a laser beam having at least one burst of laser pulses, the laser beam operating at a wavelength less than 5 µm, a laser burst pulse repetition rate between 1 Hz to 2 MHz having a number of subpulses in the range of 1 to 50 per burst of the laser pulses, and, each pulse having burst pulse energy of 5-500 µJ, from the laser beam source to the selected diffractive optical element and through the distributive-focus lens focusing assembly and to the substrate, wherein the total amount of pulse energy or fluence, applied to the spots on the substrate initiates and propagates photoacoustic compression machining and prevents ablative machining; and stopping the burst of laser pulses when the machining has been completed.

A laser machining apparatus for drilling orifices in and texturing a transparent substrate is disclosed and claimed. The apparatus comprises: a laser source in the form of a laser beam having at least one burst of laser pulses, the laser beam operating at a wavelength less than 5 µm, a laser burst pulse repetition rate between 1 Hz to 2 MHz having a number of subpulses in the range of 1 to 50 per burst of the laser pulses, and, each pulse having a burst pulse energy of 5-500 µl, an optical element selected from the group consisting of a diffractive optical element, a multi-facet cylindrical lens, a multi-facet Fresnel prism, and a pyramid prism; a distributive-focus lens focusing assembly, the distributive focus lens focusing assembly is selected from the group consisting of: aspheric plates, telecentric lenses, non-telecentric lenses, aspheric lenses, axicon, annularly faceted lenses, custom ground aberrated non-perfect lenses, a combination of positive and negative lenses or a series of corrective plates, and, an optical element tilted with respect to the incident beam; the distributive-focus lens focusing assembly adjusts the ultrafast laser pulses such that the laser fluence of the ultrafast laser pulses forms spots on the surface of the substrate and the spots are located above or below the principal focal waist; means for adjusting the distributive-focus lens focusing assembly with respect to the distance of the distributive-focus lens focusing assembly from the optical element and the laser source such that: the laser fluence of the ultrafast laser pulses forms spots on the surface of the substrate and the spots are located above or below the principal focal waist; and, the fluence level of the at least one secondary focal waists is or they are of sufficient intensity and number to ensure propagation of photoacoustic compressive machining through volumes of the substrate; means for adjusting the distributive-focus lens focusing assembly with respect to the angle of the distributive-focus lens focusing assembly with respect to the optical element and the laser source such that: the laser fluence of the ultrafast laser pulses forms spots on the surface of the substrate and the spots are located above or below the principal focal waist; and, the fluence level of the at least one secondary focal waists is or they are of sufficient intensity and number to ensure propagation of photoacoustic compressive machining through volumes of the substrate; the laser beam passes through the selected optical element and the selected distributive-focus lens focusing assembly such that the total amount of pulse energy or fluence, applied to the spots on the substrate initiates and propagates photoacoustic compression machining and prevents ablative machining.

The means for adjusting the distributive-focus lens focusing assembly with respect to the distance of the distributive-focus lens focusing assembly from the optical element and the laser source can be any mechanical means which support the respective elements and allows movement therebetween. The means for adjusting the distributive-focus lens focusing assembly with respect to the angle of the distributive-focus lens focusing assembly with respect to the optical element and the laser source can be any mechanical means which support the respective elements and allows movement therebetween.

In another embodiment of the present invention multiple filamentation develops orifices formation from the top to the bottom of the sample. The orifices further can be etched out to form multiple well controlled hole drilling with less than 2 µm diameter and 3 mm long (depth). Without limitation, orifices can be limited to form inside the substrate to perform volume structuring/volume grating. Due to nature of volume grating, natural light is diffracted in a proper viewing angle resulting in a rainbow color marking effect.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

BRIEF DESCRIPTION OF THE DRAWINGS

FIGS. 9-11 show three various configurations of the distribution of laser energy.

DETAILED DESCRIPTION

Figure 1:
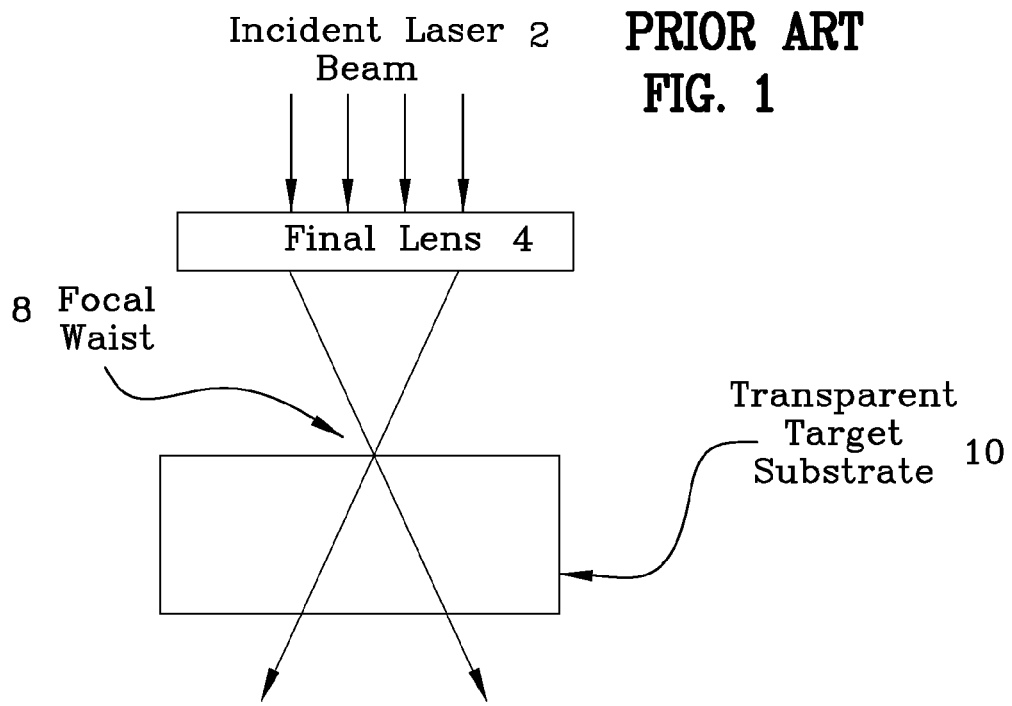
FIG. 1 is a diagrammatic representation of a prior art ablative laser direct writing arrangement wherein the principal focus occurs at the top surface of the transparent substrate.

Various embodiments and aspects of the disclosure will be described hereinbelow. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

Unless defined otherwise, all technical and scientific terms used herein are intended to have the same meaning as commonly understood to one of ordinary skill in the art. Unless otherwise indicated, such as through context, as used herein, the following terms are intended to have the following meanings:

As used herein, the term ablative texturing refers to a method of machining a target (generally by cutting or drilling of a substrate by the removal of material) surface by irradiating it with a laser beam. At low laser flux, the material is heated by the absorbed laser energy and evaporates or sublimates. At high laser flux, the material is typically converted to a plasma. Usually, laser ablation refers to removing material with a pulsed laser, but it is possible to ablate material with a continuous wave laser beam if the laser intensity is high enough. Ablative drilling or cutting techniques are characterized by the creation of a debris field, the presence of a liquid/molten phase at some point during the material removal process, and the creation of an ejecta mound at the entrance and or exit of the feature.

As used herein, the term "photoacoustic drilling" refers to a method of machining a target generally by cutting or drilling of a substrate from a solid by irradiating it with a lower pulse energy light beam than is used in ablative drilling or cutting techniques. Through the processes of optical absorption followed by thermoelastic expansion, broadband acoustic waves are generated within the irradiated material to form a pathway of compressed material about the beam propagation axis (common with the axis of the orifice) therein that is characterized by a smooth wall orifice, a minimized or eliminated ejecta and minimized microcrack formation in the material.

As used herein the term "optical efficiency" relates to the ratio of the fluence at the principal focal waist to the total incident fluence at the clear aperture of the focusing element or assembly.

As used herein, the term "transparent" means a material that is at least partially transparent to an incident optical beam. More preferably, a transparent substrate is characterized by absorption depth that is sufficiently large to support the generation of an internal filament modified array by an incident beam according to embodiments described herein. A transparent material has an absorption spectrum and thickness such that at least a portion of the incident beam is transmitted in the linear absorption regime.

As used herein the term "texturing" refers to any laser process that is used to change the surface or volume morphology of the transparent substrate whether it be by drilling stopped or through orifices, scribing or general machining techniques.

As used herein, the term "filament modified zone" refers to a filament region within a substrate characterized by a region of compression defined by the optical beam path.

As used herein, the phrases "burst", "burst mode", or "burst pulses" refer to a collection of laser pulses having a relative temporal spacing that is substantially smaller than the repetition period of the laser. It is to be understood that the temporal spacing between pulses within a burst may be constant or variable and that the amplitude of pulses within a burst may be variable, for example, for the purpose of creating optimized or pre-determined filament modified zones within the target material. In some embodiments, a burst of pulses may be formed with variations in the intensities or energies of the pulses making up the burst.

As used herein, the phrase "geometric focus" refers to the normal optical path along which light travels based on the curvature of the lens, with a beam waist located according to the simple lens equation common to optics. It is used to distinguish between the optical focus created by the position of the lenses and their relation to one another and the constriction events created by thermal distortion in the target materials providing, in effect, a quasi-Rayleigh length on the order of up to 10 mm, which is particularly uncommon and related to the inventive nature of this work.

As used herein, the term "substrate" means a glass or a semiconductor and may be selected from the group consisting of transparent ceramics, polymers, transparent conductors, wide bandgap glasses, crystals, crystalline quartz, diamond, sapphire, rare earth formulations, metal oxides for displays and amorphous oxides in polished or unpolished condition with or without coatings, and meant to cover any of the geometric configurations thereof such as but not limited to plates and wafers. The substrate may comprise two or more layers wherein a location of a beam focus of the focused laser beam is selected to generate filament arrays within at least one of the two or more layers. The multilayer substrate may comprise multi-layer flat panel display glass, such as a liquid crystal display (LCD), flat panel display (FPD), and organic light emitting display (OLED). The substrate may also be selected from the group consisting of autoglass, tubing, windows, biochips, optical sensors, planar lightwave circuits, optical fibers, drinking glass ware, art glass, silicon, 111-V semiconductors, microelectronic chips, memory chips, sensor chips, electro-optical lenses, flat displays, handheld computing devices requiring strong cover materials, light emitting diodes (LED), laser diodes (LD), and vertical cavity surface emitting laser (VCSEL). Targets or target materials are generally selected from substrates.

As used herein the "principal focal waist" refers to the most tightly focused and strongest focal intensity of the beam after final focusing (after passing through the final optical element assembly prior to light incidence upon the target). It may also be used interchangeably with the term "principal focus." The term "secondary focal waist" refers to any of the other foci in the distributed beam having a lesser intensity than the principal focal waist. It may also be used interchangeably with the term "secondary focus" or "secondary foci." The term distributed focus also can mean elongated focus.

As used herein the term "filament" refers to any light beam traveling through a medium wherein the Kerr effect can be observed or measured.

As used herein the term "multiple filament" refers to many filaments forming spatially beside each other.

As used herein, "laser filamentation" is the act of creating filaments in a material through the use of a laser.

As used herein the term "machining", "texturing" or "modification" encompasses the processes of drilling orifices, cutting, scribing or dicing, a surface or volume within a target or substrate.

As used herein the term "focal distribution" refers to spatiotemporal distribution of incident light rays passing through a lens assembly that in it's aggregate is a positive lens. Generally, herein their subsequent convergence of spots of useful intensity as a function from the distance from the center of the focusing lens is discussed.

As used herein the terms "critical energy level," "threshold energy level" and 'minimum energy level" all refer to the least amount of energy that must be put into or onto a target to initiate the occurrence of a transient process in the target material such as but not limited to ablative machining, photoacoustic machining, and the Kerr effect.

As used herein the term "aberrative lens" refers to a focusing lens that is not a perfect lens wherein the lens curvature in the X plane does not equal the lens curvature in the Y plane so as to create a distributed focal pattern with incident light that passes through the lens. A positive aberrative lens is a focally converging lens and a negative aberrative lens is a focally diverging lens.

As used herein, the terms, "comprises" and "comprising" are to be construed as being inclusive and open ended, and not exclusive. Specifically, when used in the specification and claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. In one non-limiting example, the terms "about" and "approximately" mean plus or minus 10 percent or less.

The main objective of the present invention is to provide a fast, reliable and economical non-ablative laser machining technique to initiate multiple orifices (stopped/blind or through orifices) in the target material that may be initiated below or above a single of multiple stacked target material by diffraction and interference of a burst(s) of ultrafast laser pulses. Ultra short lasers offer high intensity to micromachine, to modify and to process surfaces cleanly by aggressively driving multi-photon, tunnel ionization, and electron-avalanche processes. The issue at hand is how to put enough energy in the transparent material of the target, less than that used in ablative drilling, but beyond the critical energy level to initiate and maintain photoacoustic compression so as to create a filament that modifies the index of refraction at the focal points in the material and does not encounter optical breakdown (as encountered by the prior art ablative drilling systems) such that continued refocusing of the laser beam in the target material can continue over long distances, enough so that even multiple stacked substrates can be drilled simultaneously with negligible taper over the drilled distance, a relatively smooth orifice wall and can initiate from above, below or within the target material.

Figure 3:
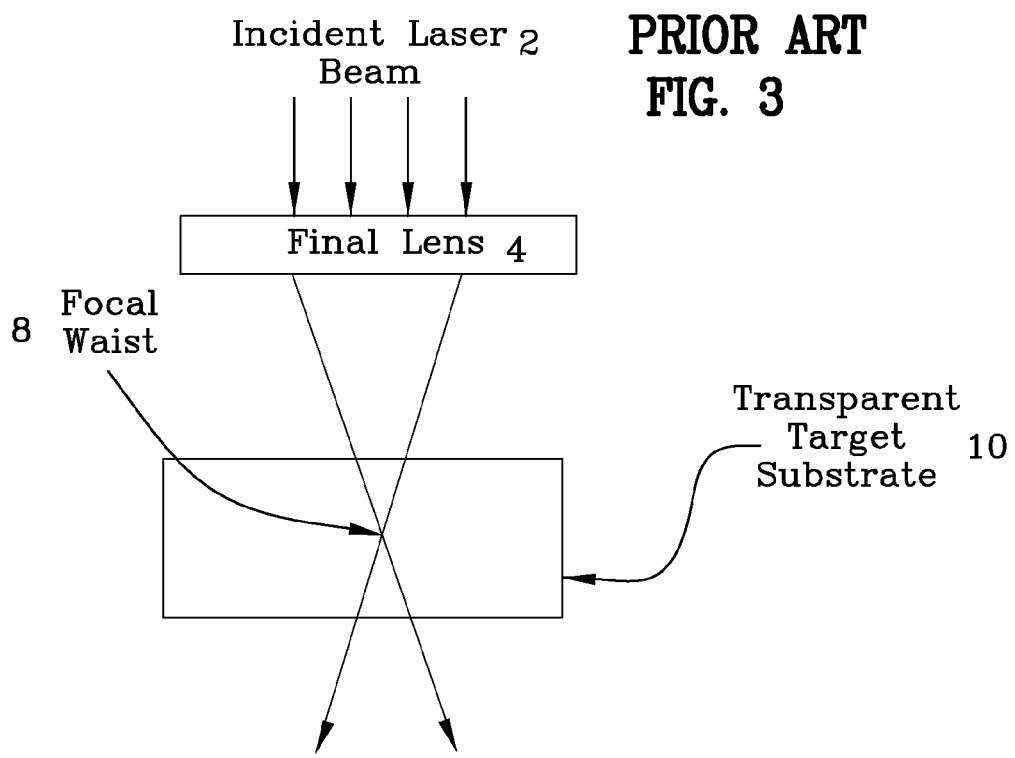
FIG. 3 is a representative side view of a prior art ablative laser internal direct writing arrangement wherein the principal focus occurs below the top surface of the transparent substrate.
Figure 2:
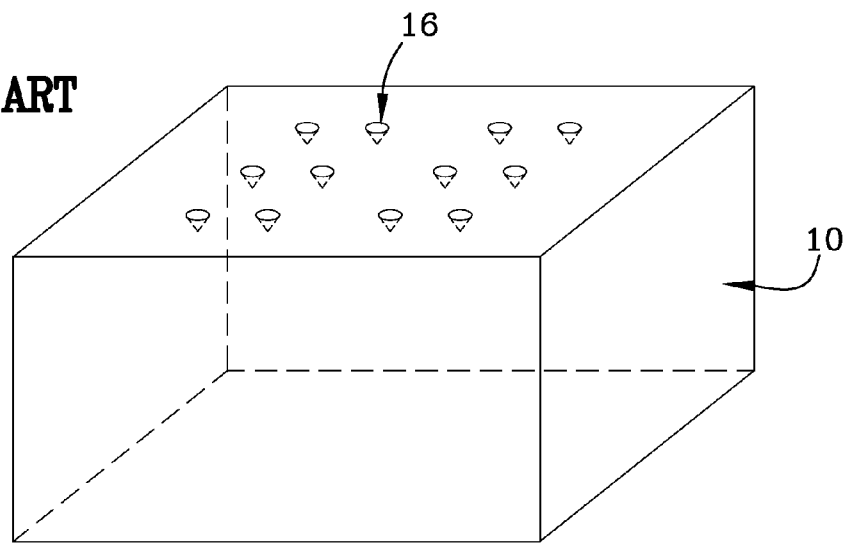
FIG. 2 is a perspective view of a laser structured surface of FIG. 1.
Figure 4:
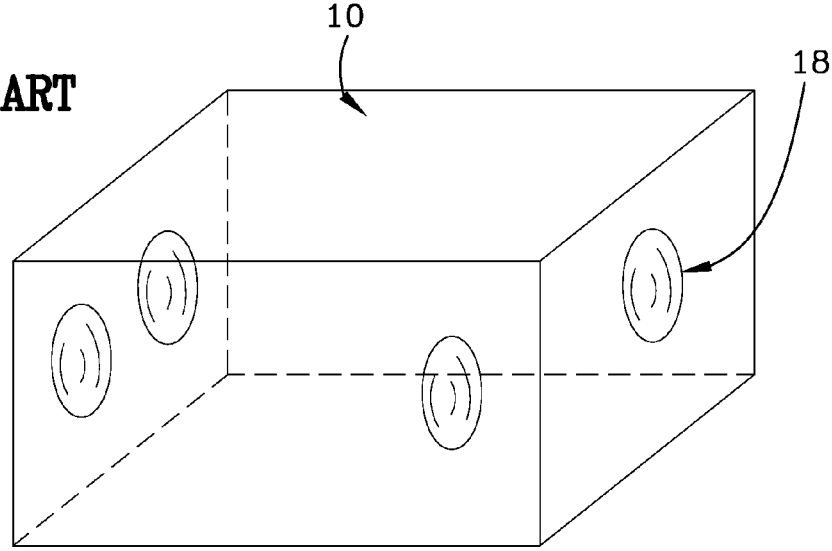
FIG. 4 is a perspective view of a structure formed by the machining arrangement of FIG. 3.

Generally, in the prior art, laser ablation techniques that utilize a high energy pulsed laser beam that is focused to a single principal focus above, within or at a surface of the material, have been used to machine transparent materials. As shown in FIG. 1 the incident laser light beam 2 passes through a focusing assembly passing through a final focusing lens 4 so as to focus a non-distributed light beam 6 that has a focal waist 8 at the surface of the target 10. As can be seen in FIG. 3, optionally, the non-distributed light beam may be focused such that the focal waist resides within the target. Generally these techniques use a perfect spherical focusing lens 4. This creates a tight beam spot that is then delivered as illustrated in FIG. 1 or as illustrated in FIG. 3 in the target substrate material 10. In a tight focusing configuration optical break down takes place resulting in the creation of a damage or void in the focus and immediately the laser beam diverges outwardly. FIG. 2 illustrates the geometry of a machined voids 16 cut with the technique of FIG. 1. FIG. 3 illustrates the geometry of tight focus inside the material, and FIG. 4 illustrates the geometry of an oblong orifice 18 made with the technique illustrated in FIG. 3.

Propagation of intense ultrafast laser pulses in different optical media has been well studied. The nonlinear refractive index of a material is a function of laser intensity. Having an intense laser pulse with Gaussian profile, wherein the central part of the pulse has much higher intensity than the tails, means the refractive index varies for the central and surrounding areas of the material seeing the laser beam pulse. As a result, during propagation of such laser pulse, the pulse collapses automatically. This nonlinear phenomenon is known as self-focusing. Self-focusing can be promoted also using a lens in the beam path. In the focal region the laser beam intensity reaches a value that is sufficient to cause multiple-ionization, tunnel ionization and avalanche ionization which creates plasma in the material. Plasma causes the laser beam to defocus and refocus back to form the next plasma volume. The inherent problem with a single focus in a non-distributed beam is that the process ends after the laser pulses lose all their energy and are unable to refocus as discussed below.

Figure 5:
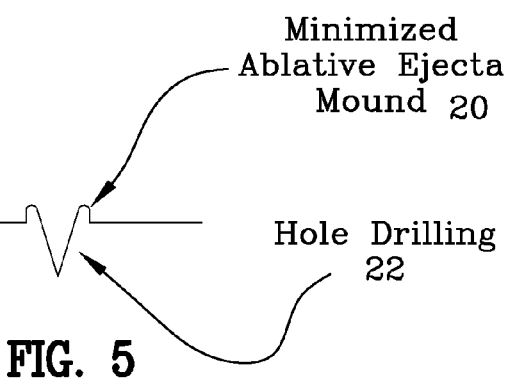
FIG. 5 is an enlarged view of the hole drilling of the arrangement of FIG. 1.

In the prior art, this ablative method develops a plasma void in the material 10 of a length of up to 30 microns until it exceeds the optical breakdown threshold for that material and optical breakdown (OB) occurs. At OB the maximum threshold fluence (the energy delivered per unit area, in units of $J/m^2$) is reached and the orifice diameter narrows and ablative machining or drilling ceases to proceed any deeper. This occurs because in ablative machining, the beam has central focus 8 (also referred to as a principal focal waist) at the surface of the target 10 causing localized heating and thermal expansion therein heating the surface of the material 10 to its boiling point and generating a keyhole. The keyhole leads to a sudden increase in optical absorptivity quickly deepening the orifice. As the orifice deepens and the material boils, vapor generated erodes the molten walls blowing ejecta 20 out and further enlarging the orifice 22 as illustrated in FIG. 5. As this occurs, the ablated material applies a pulse of high pressure to the surface underneath it as it expands. The effect is similar to hitting the surface with a hammer and brittle materials are easily cracked. Additionally, brittle materials are particularly sensitive to thermal fracture which is a feature exploited in thermal stress cracking but not desired in orifice drilling. OB generally is reached when the debris is not ejected, a bubble is created in the orifice 22 or there is a violent ablation that cracks the target in the area of the orifice 22. Any one or a combination of these effects causes the beam 6 to scatter from this point or be fully absorbed not leaving enough beam power (fluence) to drill down through the material 10 any further. Additionally, this creates a distortion or roughness known as the ablative ejecta mound 20 found around the initiating point at the surface of the target substrate 10.

In the prior art, another problem with laser ablation techniques is that the orifices it drills are not of a uniform diameter. In the prior art, the laser beam focus changes its diameter as a function of distance (depth). This is described as the Rayleigh range and is the distance along the propagation direction of a beam from the focal waist to the place where the area of the cross section is doubled. This results in a tapered orifice 22 as shown in FIG. 5.

The present invention solves the optical breakdown problem, minimizes the orifice roughness and the ablative ejecta mound, and eliminates the tapering diameter orifice. It also provides a method to do batch surface drilling and structuring and volume structuring.

Figure 6:
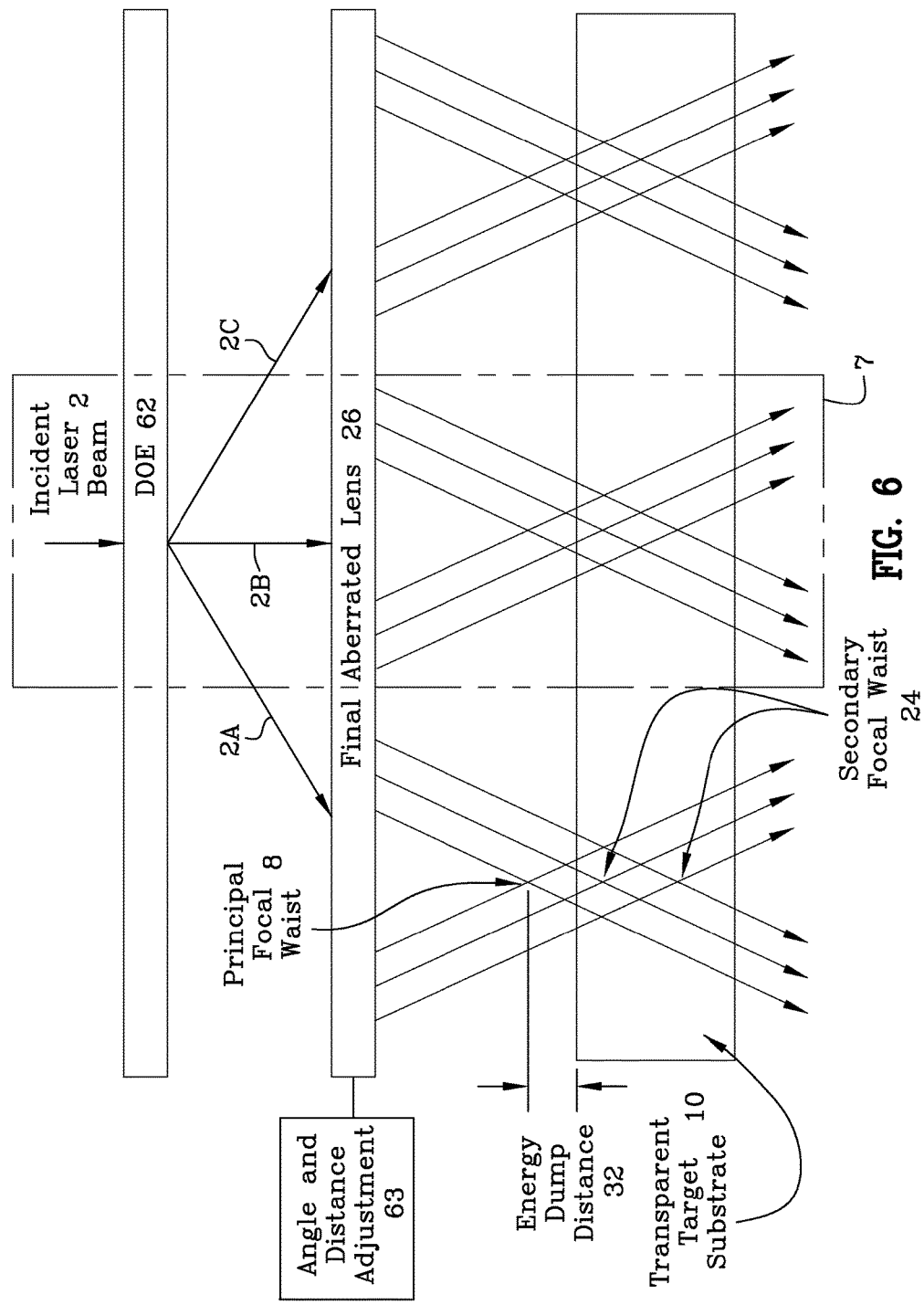
FIG. 6 is a diagrammatic representation of the present invention where diffractive elements are used to initiate multiple filaments.

The present disclosure provides devices, systems and methods for the processing of orifices in transparent materials by laser induced photoacoustic compression. Unlike previously known methods of laser material machining, embodiments of the present invention utilize an optical configuration that focuses the incident beam 2 in a three dimensional distributed manner along the longitudinal beam axis. As shown in FIG. 6, laser beam 2 is distributed spatially via a diffractive optical element (DOE) 62 such that a single beam is modified to form multiple beams 2A, 2B, 2C or is modified to form a beam with multiple high intensities. As such, each intense region that exceeds the critical power initiates filament formation inside the material. As shown by H. Schroder et. al. (Optics Express Vol. 12, Issue 20, p. 4768 (2004)) such multiple filaments will develop inside liquid. In this experiment a beam of ultrafast laser pulses is diffracted via a metal mesh and is then spatially distributed in a profile propagated inside the liquid. Each intense domain tends to go through self-focusing resulting in plasma channel formation and whitelight generation via multiple filaments. Using 2D lens arrays instead of metal mesh or other means of diffractive elements such as multi facet lens, Fresnel prism, or multi facet pyramid, improves light distribution. When the laser is operating in the burst mode, heat accumulation and effective photoacoustic shock wave is produced that solidifies the multiple filamentation in solids. The aberrative focusing lens arrangement 26 can be used after the DEO for more efficient focusing.

A distance adjustment means 63 can be used to adjust the distributive-focus lens focusing assembly with respect to the distance of the distributive-focus lens focusing assembly from the optical element and the laser source such that: the laser fluence of the ultrafast laser pulses forms spots on the surface of the substrate and the spots are located above or below the principal focal waist; and, the fluence level of the at least one secondary focal waists is or they are of sufficient intensity and number to ensure propagation of photoacoustic compressive machining through volumes of the substrate. An angle adjustment means 63 can be used to adjust the distributive-focus lens focusing assembly with respect to the angle of the distributive-focus lens focusing assembly with respect to the optical element and the laser source such that: the laser fluence of the ultrafast laser pulses forms spots on the surface of the substrate and the spots are located above or below the principal focal waist; and, the fluence level of the at least one secondary focal waists is or they are of sufficient intensity and number to ensure propagation of photoacoustic compressive machining through volumes of the substrate.

Figure 7:
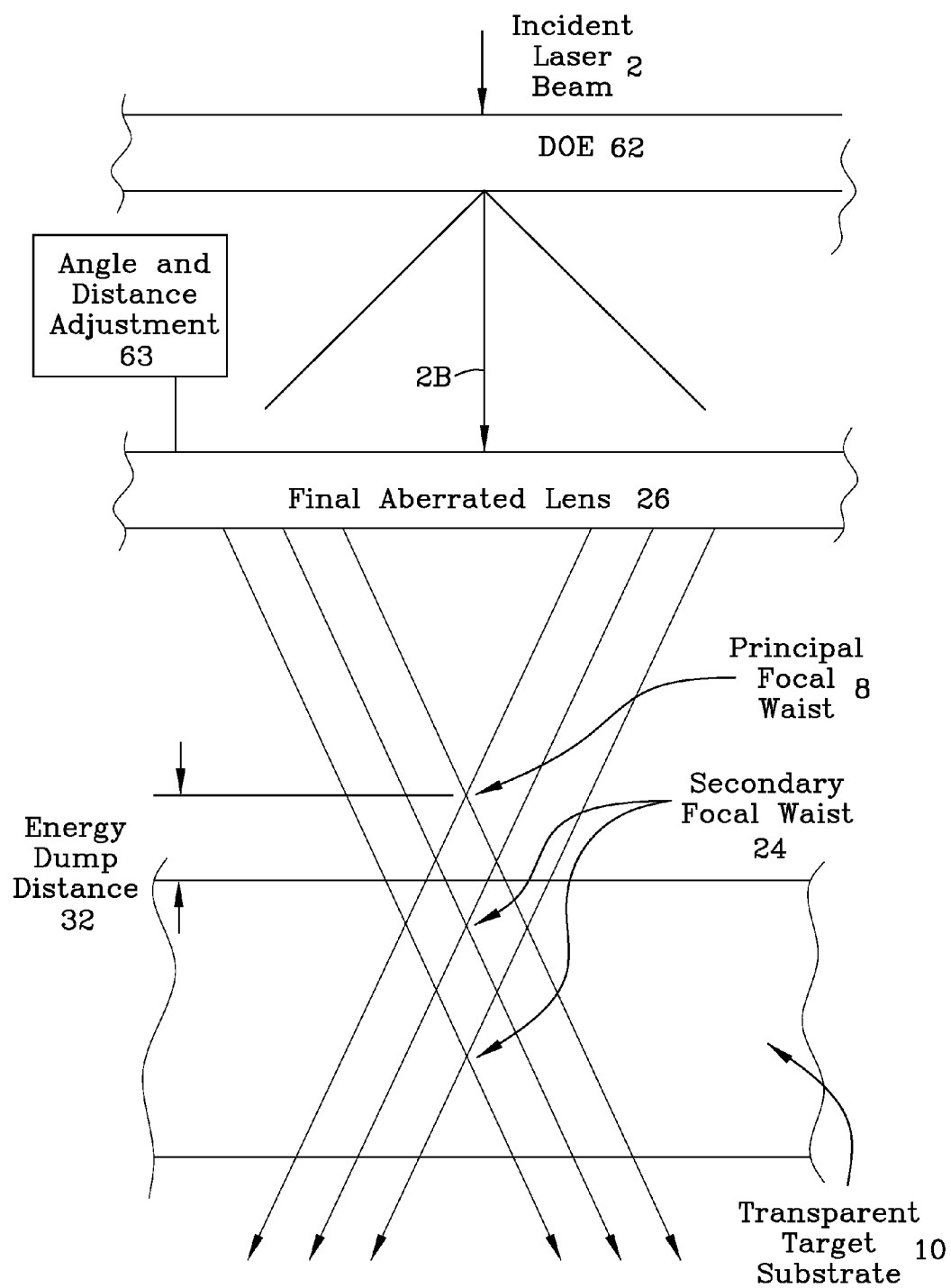
FIG. 7 is an enlarged schematic view of one filament formed in a transparent substrate the arrangement of the FIG. 6.

FIG. 7 is an enlarged view of one of the focusing domains that results in filament formation. When the spatio-distributed beam is applied to the abberrative lens 26 there is a linear alignment of the principal focus 8 and secondary foci 24 (coincident to the linear axis of the orifice but vertically displaced from the principal focus or focal waist) to allow the continual refocusing of the incident beam 2 as it travels through the material 10 thereby enabling the creation of a filament that modifies the index of refraction along the beam path in the material 10 and does not encounter optical breakdown (as seen in the prior art ablative drilling systems both with and without the use of rudimentary filamentation) such that continued refocusing of the laser beam in the target material can continue over long distances.

This distributed focusing method allows for the "dumping" or reduction of unnecessary energy from the incident beam 2 found at the principal focal waist 8 by the creation of secondary foci 24 by the distributed focusing elements assembly 26, and by positioning the location of the principal focal waist 8 to outside the material 10. This dumping of beam fluence combined with the linear alignment of the principal focal waist 8 and secondary focal waists 24 enables the formation of filaments over distances well beyond those achieved to date using previously known methods (and well beyond 1 mm) while maintaining a sufficient laser intensity (fluence $\mu J/cm^2$) to accomplish actual modification and compression over the entire length of the filament zone. This distributed focusing method supports the formation of filaments with lengths well beyond one millimeter and yet maintains an energy density beneath the optical breakdown threshold of the material with intensity enough so that even multiple stacked substrates can be drilled simultaneously across dissimilar materials (such as air or polymer gaps between layers of target material) with negligible taper over the drilled distance, and a relatively smooth walled orifice wall.

The optical density of the laser pulse(s) initiates a self focusing phenomena and generates a filament of sufficient intensity to non-ablatively initiate photoacoustic compression in a zone within/about/around the filament. Also, a linear symmetrical void of substantially constant diameter coincident with the filament is created. Still further, the laser pulse(s) also cause successive self focusing and defocusing of the laser pulse(s) which coupled with the energy input by the secondary focal waists of the distributed beam forms a filament that directs/guides the formation of the orifice across or through the specified regions of the target material. The resultant orifice can be formed without removal of material from the target, but rather by a photoacoustic compression of the target material about the periphery of the orifice formed.

It is known that the fluence levels at the surface of the target 10 are a function of the incident beam intensity and the specific distributed focusing elements assembly, and are adjusted for the specific target material(s), target(s) thickness, desired speed of machining, total orifice depth and orifice diameter. Additionally, the depth of orifice drilled is dependent on the depth over which the laser energy is absorbed, and thus the amount of material removed by a single laser pulse, depends on the material's optical properties and the laser wavelength and pulse length.

Figure 8A:
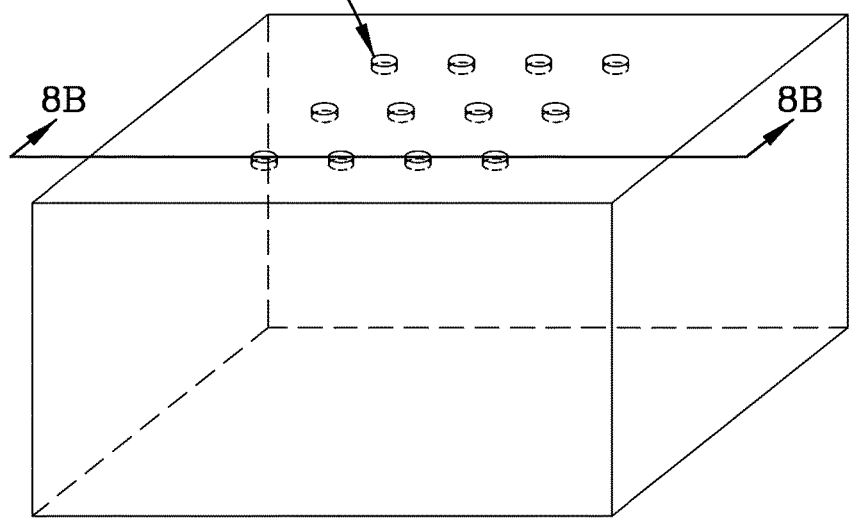
FIG. 8A is a diagrammatic view of the substrate created by the present invention of FIG. 6 wherein stopped orifices have been drilled in the surface of the substrate.
Figure 8B:
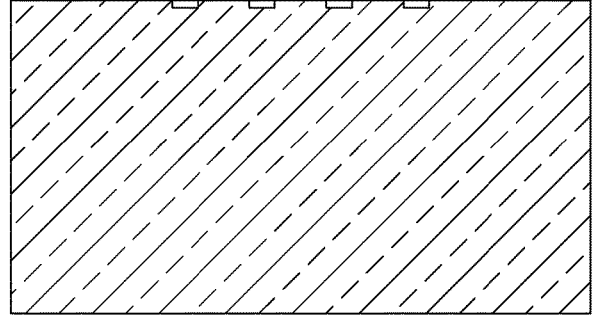
FIG. 8B is a cross-sectional view taken along the lines 8B-8B of FIG. 8A illustrating the depth of the stopped orifices.
Figure 8C:
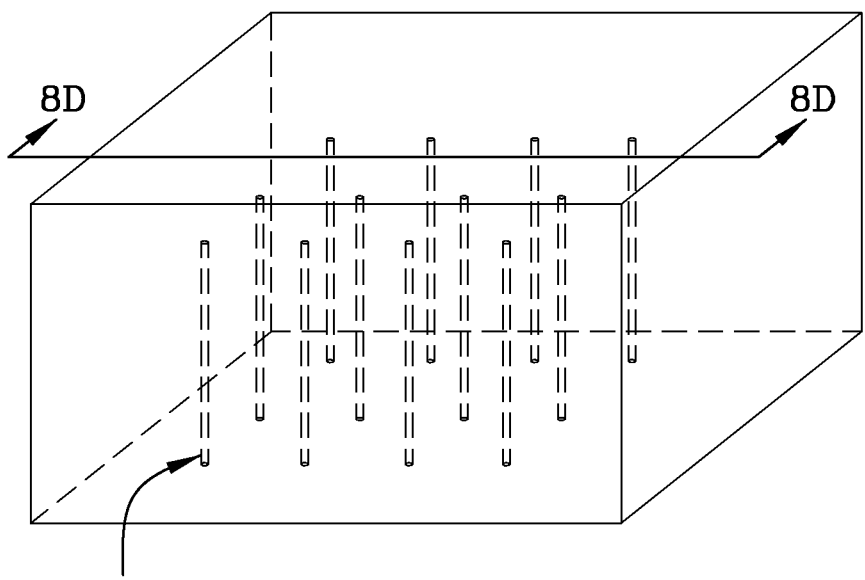
FIG. 8C is a diagrammatic view of the substrate created by the present invention of FIG. 6 wherein volume orifices have been drilled inside the substrate.
Figure 8D:
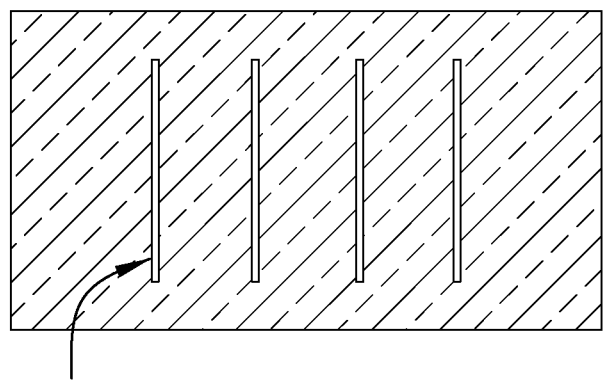
FIG. 8D is a cross-sectional view taken along the lines 8D-8D of FIG. 8C.

FIG. 8A illustrates limited filament formation in the surface of a substrate that causes surface structuring in a single light exposure. FIG. 8B is a cross-sectional view taken along the lines 8B-8B of FIG. 8A illustrating the depth of the stopped orifices. FIG. 8C is a diagrammatic view of the present invention of FIG. 6 wherein cylindrical volumes have been drilled (formed) inside the substrate. FIG. 8C illustrates volume filaments up to 10 mm long formed inside the material. FIG. 8D is a cross-sectional view taken along the lines 8D-8D of FIG. 8C illustrating cylindrical volumes within the substrate. It should be noted that no material has been removed from the examples illustrated in FIGS. 8A-8D.

The techniques disclosed herein create surface and volume grating structures which if illuminated with natural light produce a beautiful rainbow color. In the prior art, traditional laser marking, a single beam of laser marks the surface or volume of the material. In the prior art, there are efforts to mark with multiple laser sources. Having a DOE right before the galvo scanner can induce a multiple beam marking scheme that ends up with grating markings that result in colorful markings.

To accomplish photoacoustic compression machining including texturing, requires the following system:

a burst pulse laser system capable of generating a beam comprising a programmable train of pulses containing from 1 to 50 subpulses within the burst pulse envelope. Further the laser system needs to be able to generate average power from 1 to 200 watts depending on the target material utilized, typically this range would be in the range of 50 to 100 watts for borosilicate glass;

a diffractive optical element to distribute the profile of the beam spatially into multiple beams;

a distributed focusing element assembly (potentially comprising positive and negative lenses but having a positive focusing effect in the aggregate) capable of producing a weakly convergent, multi foci spatial beam profile where the incident fluence at the target material is sufficient to cause Kerr-effect self-focusing and propagation; and, an optical delivery system capable of delivering the beam to the target.

Commercial operation would also require translational capability of the material (or beam) relative to the optics (or vice versa) or coordinated/compound motion driven by a system control computer.

The use of this system to drill photoacoustic compression orifices requires the following conditions be manipulated for the specific target(s): the properties of the distributed focus element assembly; the burst pulsed laser beam characteristics; and the location of the principal focus.

The distributed focus element assembly 63 may be selected from generally known focusing elements commonly employed in the art such as aspheric plates, telecentric lenses, non-telecentric lenses, aspheric lenses, annularly faceted lenses, custom ground aberrated (non-perfect) lenses, a combination of positive and negative lenses or a series of corrective plates (phase shift masking), any optical element tilted with respect to the incident beam, and actively compensated optical elements capable of manipulating beam propagation.

The location of the principal focal waist 8 is generally in the range of 500 μm to 300 mm off of the desired point of initiation. This is known as the energy dump distance 32. It also is determined by the creation an empirical table tailored for each transparent material, the physical configuration and characteristics of the target as well as the laser parameters. It is extrapolated from a table created by the method noted above.

Figure 10:
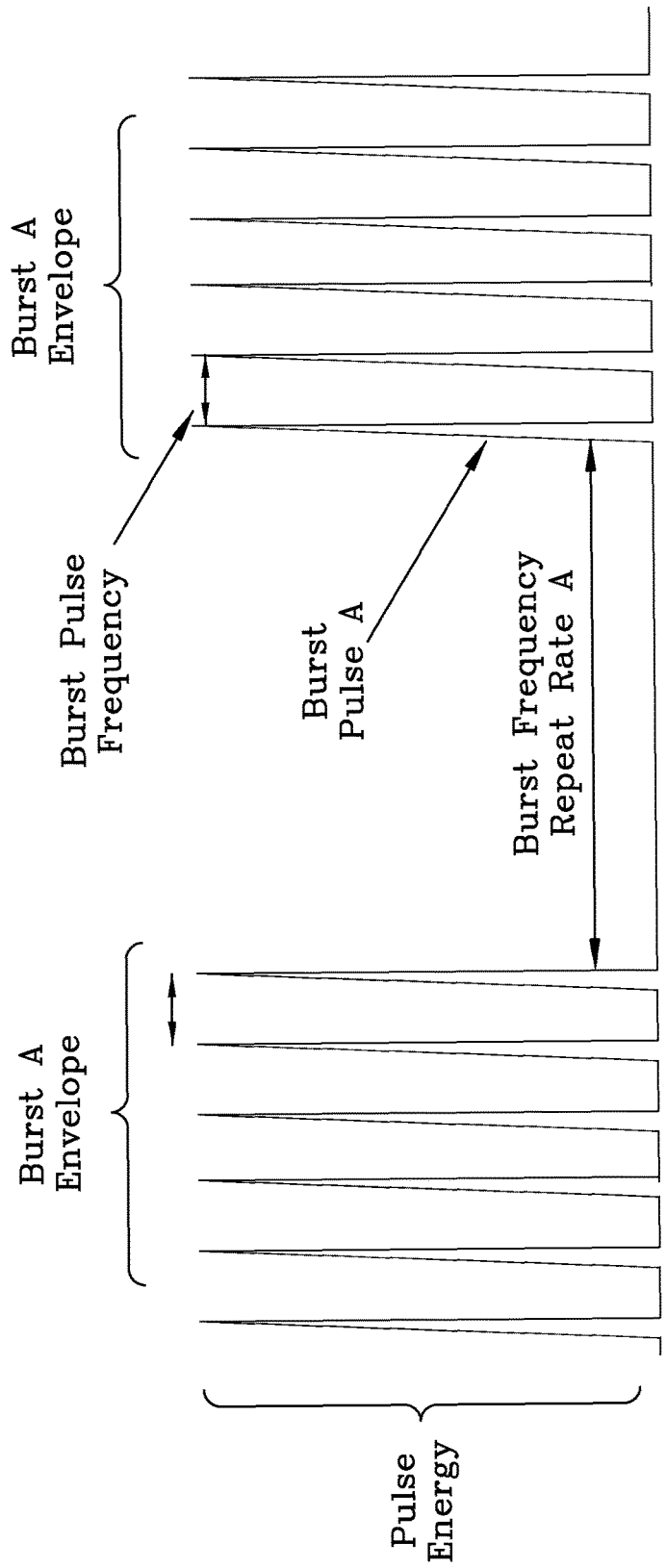
Figure 11:
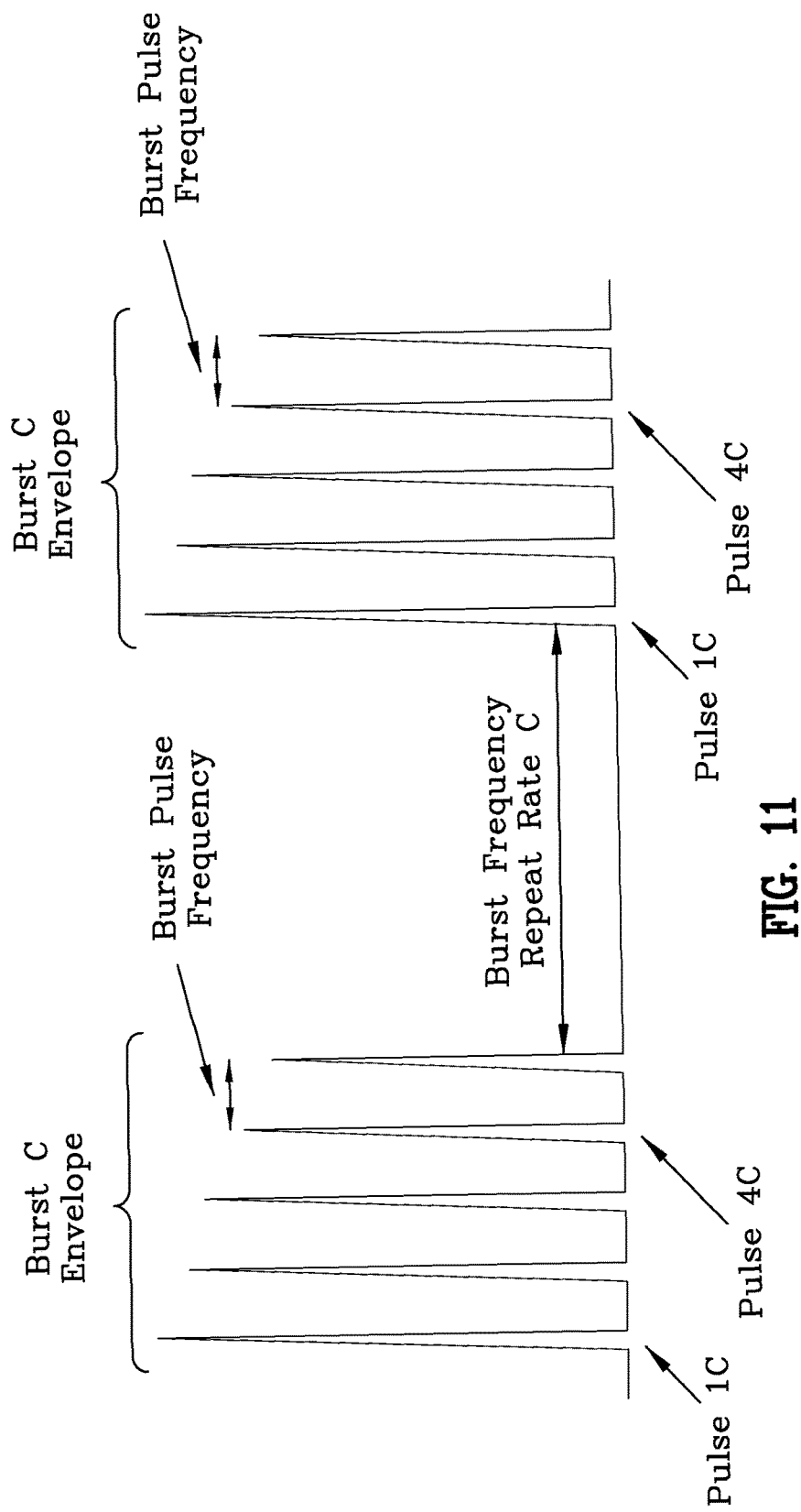

The laser beam energy properties are as follows: a pulse energy in the beam between 0.5 μJ to 500 μJ; the repetition rate from 1 Hz to 2 MHz (the repetition rate defines the speed of sample movement and the spacing between neighboring filaments); pulse duration bellow 1 ns; and, the diameter and length of the filament may be adjusted by changing the temporal energy distribution present within each burst envelope. FIGS. 9-11 illustrate examples of three different temporal energy distributions of a burst pulsed laser signal. The temporal energy distributions shown in FIGS. 9-11 are shown by way of example and other temporal energy distributions may be used.

Looking at FIGS. 9-11 collectively, the mechanism of the present invention can best be illustrated. Herein, burst picosecond pulsed light is used because the total amount of energy deposited in the target material is low and photoacoustic compression can proceed without cracking the material, and less heat is generated in the target material thus efficient smaller packets of energy are deposited in the material so that the material can be raised incrementally from the ground state to a maximally excited state without compromising the integrity of the material in the vicinity of the filament. Single laser pulses can also be used. A train of pulses may also be used to facilitate the process.

The actual physical process occurs as described herein. The principal focal waist of the incident distributed light beam of the pulsed burst laser is delivered via a DOE and distributed focusing element assembly 63 to a point in space above, within or below the target material in which multiple filaments are to created. This will create on the target surface spots as well as white light generation. The diameter of the spot on the target surface will exceed the filament diameter and the desired feature (orifice, slot, etc) diameter. The amount of energy thus incident in the spot on the surface being greater than the critical energy for producing the quadratic electro-optic effect (Kerr effect—where the change in the refractive index of the material is proportional to the applied electric field) but is lower than the critical energy required to induce ablative processes and more explicitly below the optical breakdown threshold of the material. Self focusing occurs if the incident beam has power above the critical power. Photoacoustic compression proceeds as a consequence of maintaining the required power in the target material over time scales such that balancing between the self-focus condition and the optical breakdown condition can be maintained. This photoacoustic compression is the result of a uniform and high power filament formation and propagation process whereby material is rearranged in favor of removal via ablative processes. The extraordinarily long multiple filament thus produced are fomented by the presence of spatially extended secondary foci created by the distributed focusing element assembly, maintaining the self focusing effect without reaching optical breakdown. In this assembly, a large number of marginal and paraxial rays converge at different spatial locations relative to the principal focus. These secondary foci exist and extend into infinite space but are only of useful intensity over a limited range that empirically corresponds to the thickness of the target. Focusing the energy of the second foci at a lower level below the substrate surface but at the active bottom face of the filament event, allows the laser energy access to the bulk of the material while avoiding absorption by plasma and scattering by debris.

The distributed focal element assembly can be a single aberrated focal lens (having huge spherical aberration as an example) placed in the path of the incident laser beam to develop what appears to be an unevenly distributed focus of the incident beam into a distributed focus beam path containing a principal focal waist and a series of linearly arranged secondary focal waists (foci) to elongate the focus. This distributed focus allows the amount of laser energy to be deposited in the material so as to form a filament line. With multiple linear aligned foci and by allowing the material to act as the final lens, the target material when bombarded with ultrafast burst pulse laser beams, undergoes numerous, successive, localized heatings which thermally induce changes in the material's local refractive index along the path of the linearly aligned foci causing a lengthy untapered multiple filament to be developed in the target followed by an acoustic compression wave that annularly compresses the material in the desired regions creating a void and a ring of compressed material about the filamentation path. Then the beam refocuses and the refocused beam combined with the energy at the secondary focal waists maintains the critical energy level and this chain of events repeats itself so as to drill an orifice capable of a 1500:1 aspect ratio (length of orifice/diameter of orifice) with little to no taper and an entrance orifice size and exit orifice size that are effectively the same diameter. This is unlike the prior art that focuses the energy on the top surface of or within the target material resulting in a short filamentation distance until the optical breakdown is reached and filamentation degrades or ceases.

The method of drilling orifices (and texturing) through photoacoustic compression is accomplished by the following steps:

1. passing laser pulses from a laser source through a selected diffractive optical element;
2. passing the laser pulses through a distributive-focus lens focusing assembly;
3. adjusting the relative distance and/or angle of the distributive-focus lens focusing assembly in relation to a laser source so as to focus the laser pulses in a distributed focus configuration to create a principal focal waist and at least one secondary focal waist;
4. adjusting the focus such that the laser fluence on the spot on the surface of the target that is located below or above the principal focal waist and has a diameter that is always larger than the diameter of a filamentation formed in the target;
5. adjusting the fluence level of the secondary focal waists are of sufficient intensity and number to ensure propagation of a photoacoustic compressive machining through the desired volume of the target; and
6. applying at least one burst of laser pulses of a suitable wavelength, suitable burst pulse repetition rate and suitable burst pulse energy from the laser source to the target through the selected DOE and distributive-focus lens focusing assembly, wherein the total amount of pulse energy or fluence, applied to the target at a spot where the laser pulse contacts the surface and initiates machining on the target, is greater than the critical energy level required to initiate and propagate photoacoustic compression machining, yet is lower than the threshold critical energy level required to initiate ablative machining; and
7. stopping the burst of laser pulses when the desired machining has been completed.

As mentioned earlier, there may be specific orifice configurations wherein a tapered entrance to the orifice may be desired. This is accomplished by initiation of the orifice with a laser fluence level that is capable of ablative machining for a desired distance and completing the drilling with a laser fluence level below the critical level for ablative machining yet above the critical level for photo-acoustic machining to the desired depth in that material.

Surface or volume modification takes place in the target/substrate material. Optionally, the modified zone may be deepened using dry or wet etching techniques. Initiating a small etched region with a laser is known in the prior art and requires one laser interaction for any single modification region popularly called direct writing. Using the new invention results in larger modified region on or in the target in a single laser irradiation.

The various parameters of the laser properties, the location of the principal focal waist, and the final focusing lens arrangements as well as the characteristics of the orifice created are set forth in the following table. It is to be noted that they are represented in ranges as their values vary greatly with the type of the target material, its thickness and the size and location of the desired orifice. The following chart details the ranges of the various system variables used to accomplish the drilling of uniform orifices in any of a plethora of transparent materials.

| Laser Properties | |
| --- | --- |
| Wavelength | 5 microns or less |
| Pulse width | 10 nanoseconds or less |
| Freq (laser pulse repetition rate) | 1 Hz to 2 MHz |
| Ave power | 200-1 watt |
| Number of sub pulses per burst | 1 to 50 |
| Sub pulse spacing | 1 nanosecond to 10 microsecond |
| Pulse energy | 5 uJ to 500 micro Joules (uJ) (Average power/repetition rate) watts/1/sec |
| Orifice Properties | |
| Min Orifice Diameter | .5 microns |
| Max Orifice Diameter | 50 microns |
| Max Orifice Depth | 10 mm in borosilicate glass |
| Typical Aspect Ratio | 1500:1 |
| Max Aspect Ratio | 2500:1 |
| Aberrated lens ratio | where the cx:cy ratio of the lenses are (−5 to 4000) |
| Orifice Sidewall Smoothness (Material Independent) | <5 micron ave. roughness (e.g., Si, SiC, SiN, GaAs, GaN, InGaP) |
| Orifice Side Wall Taper (Material Independent) | Negligible across 10,000 micron depth |
| Beam Properties | |
| Focal Distribution | −5 to 4,000 |
| $M^2$ | 1.00-5.00 |

As noted earlier the parameters above vary with the target. In the way of an operational exemplary, to modify a 1 micron diameter, 2 mm long filament in a transparent substrate, the following apparatus and parameters would be used: a 1064 nanometer wavelength laser; 50 watts of average power; 200 uJ per pulse energy; 5 subpulses per burst; and a 50 kHz repetition rate. This would be focused with a diffractive element (i.e. two dimensional beam splitter) to make multiple beams, the output coupled with a lens delivering distributed foci over 2 mm of space (filament active zone is 2 mm long) focusing 0 microns to 500 um above the top surface depending upon the material.

It is to be understood that the invention is not limited in its application to the arrangements of the components set forth in the following description or illustrated in the drawings. The invention is capable of other embodiments and of being practiced and carried out with various different ordered steps. Also, it is to be understood that the phraseology and terminology employed herein are for the purpose of descriptions and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The invention claimed is:

1. A photoacoustic compression method of texturing a transparent substrate, comprising the steps:
providing a laser beam from a laser source, said laser beam having a wavelength of less than 5 um, said laser beam having at least one burst of ultrafast laser pulses at a burst repetition rate of between 1 Hz and 2 MHz, each of said at least one burst of ultrafast laser pulses having between 1 and 50 subpulses, each one of said subpulses having an energy of 5 to 500 uJ;
passing said at least one burst of ultrafast laser pulses of said laser beam through a diffractive optical element thereby forming a plurality of spatially-distributed laser beams;
passing said plurality of spatially-distributed laser beams through a distributive focusing assembly and to said transparent substrate thereby focusing each one of said plurality of spatially-distributed laser beams along a respective longitudinal beam axis;
adjusting said distributive focusing assembly such that each of said plurality of spatially-distributed focused laser beam has a principal focus waist and at least one secondary focal waist linearly arranged along said respective longitudinal beam axis, and said plurality of spatially-distributed focused laser beams forming a plurality of spots on a surface of said transparent substrate;
adjusting the total amount of pulse energy or fluence applied to each of said plurality of spots on said surface of said transparent substrate and adjusting the fluence and number of secondary focal waists in each one of said plurality of focused laser beams forming filaments inside said transparent substrate so as to preventing ablative machining, and ensuring propagation of photoacoustic compressive machining through desired volumes at multiple locations in said transparent substrate; and,
stopping said bursts of ultrafast laser pulses of said laser beam upon completion of said photoacoustic compressive machining.

2. The photoacoustic compression method of texturing a transparent substrate as claimed in claim 1, further comprising the steps of:
adjusting the relative distance or angle of said distributive-focus lens focusing assembly in relation to said laser source so as to focus said ultrafast laser pulses with respect to each spot formed on said surface of said substrate.

3. The photoacoustic compression method of texturing a transparent substrate as claimed in claim 1, further comprising the steps of:
each one of said plurality of spots on said surface of said substrate has a diameter larger than a diameter of the respective filament formed in said transparent substrate.

4. The photoacoustic compression method of texturing a transparent substrate as claimed in claim 1, wherein:
said laser pulses have a burst frequency in the range of 100 kHz to 90 MHz to maintain photoacoustic compression within said transparent substrate, said laser pulses having a pulse width of less than 10 nanoseconds.

5. The photoacoustic compression method of texturing a transparent substrate as claimed in claim 1, wherein: no material from said transparent substrate is removed from said transparent substrate by said photoacoustic compression.

6. The photoacoustic compression method of texturing a transparent substrate as claimed in claim 1, wherein said distributive focus lens focusing assembly is selected from the group consisting of: aspheric plates, telecentric lenses, non-telecentric lenses, aspheric lenses, axicon, annularly faceted lenses, custom ground aberrated non-perfect lenses, a combination of positive and negative lenses or a series of corrective plates, and, an optical element tilted with respect to the incident beam.

7. The photoacoustic compression method of texturing a transparent substrate as claimed in claim 1, wherein said diffractive optical element is a micro lens array.

8. The photoacoustic compression method of texturing a transparent substrate as claimed in claim 1, wherein said diffractive optical element is a two dimensional beam splitter.

9. A photoacoustic compression method of texturing a transparent substrate, comprising the steps of:
providing a laser beam of ultrafast laser pulses from a laser source, said laser beam having a wavelength of less than 5 um, said laser beam having at least one burst of ultrafast laser pulses at a burst repetition rate of between 1 Hz and 2 MHz, each of said at least one burst of ultrafast laser pulses having between 1 and 50 subpulses, each one of said subpulses having an energy of 5 to 500 uJ;
passing said at least one burst of ultrafast laser pulses of said laser beam from said laser source through an optical element selected from the group consisting of a diffractive optical element, a multi-facet cylindrical lens, a multi-facet Fresnel prism, and a pyramid prism thereby forming a plurality of spatially-distributed laser beams;
passing said at least one burst of ultrafast laser pulses of each of said plurality of spatially-distributed laser beams through a distributive-focus lens focusing assembly and onto said transparent substrate;
adjusting the focus of said ultrafast laser pulses of each of said spatially-distributed laser beams and applying the total amount of pulse energy or laser fluence of said ultrafast laser pulses of said plurality of spatially-distributed laser beams onto said transparent substrate forming multiple spots on the surface of said transparent substrate;

adjusting the principal focal waist and at least one secondary focal waist linearly arranged along the respective longitudinal beam axis of said ultrafast laser pulses of each of said plurality of said spatially distributed laser beams such that the number and fluence of said secondary focal waists is or are of sufficient intensity to ensure propagation of photoacoustic compressive machining through volumes of said transparent substrate at multiple locations in said substrate developing multiple filaments in said substrate while preventing ablative machining;

stopping said bursts of laser pulses of said laser beam upon completion of said photoacoustic compressive machining.

10. The photoacoustic compression method texturing a transparent substrate as claimed in claim 9, wherein said distributive focus lens focusing assembly is selected from the group consisting of: aspheric plates, telecentric lenses, non-telecentric lenses, aspheric lenses, axicon, annularly faceted lenses, custom ground aberrated non-perfect lenses, a combination of positive and negative lenses or a series of corrective plates, and, an optical element tilted with respect to the incident beam.

11. The photoacoustic compression method of texturing a transparent substrate as claimed in claim 9, further comprising the steps of:

adjusting the relative distance or angle of said distributive-focus lens focusing assembly in relation to said laser source so as to focus said ultrafast laser pulses with respect to each spot formed on said surface of said substrate.

12. The photoacoustic compression method of texturing a transparent substrate as claimed in claim 9, further comprising the steps of:

each of said spots on said surface of said substrate has a diameter larger than a diameter of the respective filament formed in said transparent target.

13. The photoacoustic compression method of texturing a transparent substrate as claimed in claim 9, wherein:

said laser pulses have a burst frequency in the range of 100 kHz to 90 MHz to maintain photoacoustic compression within said transparent target, said laser pulses having a pulse width of less than 10 nanoseconds.

14. The photoacoustic compression method of drilling orifices in and texturing a transparent substrate as claimed in claim 9, wherein: no material from said transparent target material is removed from said transparent target by said photoacoustic compression.

15. A transparent substrate machined by the method of claim 1.

16. A transparent substrate machined by the method of claim 9.

* * * * *

UNITED STATES PATENT AND TRADEMARK OFFICE
CERTIFICATE OF CORRECTION

PATENT NO. : 9,938,187 B2  
APPLICATION NO. : 14/629327  
DATED : April 10, 2018  
INVENTOR(S) : Hosseini It is certified that error appears in the above-identified patent and that said Letters Patent is hereby corrected as shown below:

In the Specification

Column 4, Line 13, after "focal" delete "waists is or they are" and insert --waist(s) is/are-- therefor.

Column 4, Line 23, after "focal" delete "waists is or they are" and insert --waist(s) is/are-- therefor.

Column 7, Line 45, after "and" delete "'minimum" and insert --"minimum-- therefor.

Column 12, Line 32, after "duration" delete "bellow" and insert --below-- therefor.

Column 12, Line 57, after "filaments are" delete "to".

Signed and Sealed this  
Twenty-ninth Day of May, 2018

Andrei Iancu  
*Director of the United States Patent and Trademark Office*